United States Patent
Briesmeister

(10) Patent No.: US 6,698,504 B2
(45) Date of Patent: Mar. 2, 2004

(54) APPARATUS AND PROCESS FOR MORE RAPIDLY COOLING PRODUCTS CONTAINED IN POUCHED OR FLEXIBLE CONTAINERS

(76) Inventor: Andrew E. Briesmeister, 1001 Goodlander Dr., Selah, WA (US) 98942

( * ) Notice: Subject to any disclaimer, the term of this patent is extended or adjusted under 35 U.S.C. 154(b) by 0 days.

(21) Appl. No.: 10/339,969

(22) Filed: Jan. 9, 2003

(65) Prior Publication Data

US 2003/0192676 A1 Oct. 16, 2003

Related U.S. Application Data

(60) Provisional application No. 60/373,360, filed on Apr. 16, 2002.

(51) Int. Cl.[7] .............................. F28F 13/12
(52) U.S. Cl. ................ 165/109.1; 165/46; 126/263.07; 126/263.08; 126/263.09; 62/63; 422/307
(58) Field of Search ............... 165/109.1, 84, 165/83, 86, 46; 99/470, 477; 422/307, 308, 309, 38; 126/263.07, 263.08, 263.09; 62/63

(56) References Cited

U.S. PATENT DOCUMENTS

| | | | | |
|---|---|---|---|---|
| 3,052,559 A | * | 9/1962 | Peebles | 426/412 |
| 3,464,835 A | * | 9/1969 | Castro | 426/232 |
| 4,057,047 A | | 11/1977 | Gossett | 126/263 |
| 4,142,508 A | | 3/1979 | Watson | 126/263 |
| 4,384,463 A | | 5/1983 | Rica et al. | |
| 4,437,315 A | | 3/1984 | Rica et al. | |
| 4,565,452 A | | 1/1986 | Wild | |
| 4,627,224 A | | 12/1986 | Hamamoto et al. | |
| 4,736,530 A | | 4/1988 | Lakic | 36/2.6 |
| 5,161,884 A | | 11/1992 | Siminovitch | 362/294 |
| 5,370,174 A | * | 12/1994 | Silvestrini et al. | 165/109.1 |
| 5,662,096 A | | 9/1997 | Walters | 126/263.03 |
| 5,809,787 A | * | 9/1998 | Zittel | 62/63 |
| 5,915,461 A | | 6/1999 | Tanhehco | 165/46 |
| 6,340,449 B1 | * | 1/2002 | Gallus | 422/307 |
| 6,387,322 B1 | * | 5/2002 | Gallus | 422/38 |

* cited by examiner

*Primary Examiner*—Terrell McKinnon
(74) *Attorney, Agent, or Firm*—Robert L. Shaver; Frank J. Dykas; Stephen M. Nipper

(57) ABSTRACT

A heat transfer array is presented which includes one or more pouch flexors that press down on a fluid product containing pouch and facilitate heat exchange by mixing the pouch contents while the exterior of the pouch is contacted by a heat exchange medium. The pouch flexors are arranged in an array of three wheels, and the pouches are subjected to a number of wheel arrays in order to exchange heat from the pouch contents. The pouch flexors are stationary and a conveyor belt moves the pouch product under the wheel arrays.

20 Claims, 5 Drawing Sheets

APPARATUS AND PROCESS FOR MORE RAPIDLY COOLING PRODUCTS CONTAINED IN POUCHED OR FLEXIBLE CONTAINERS

PRIORITY

This application claims the priority from the provisional application filed on Apr. 16, 2002 with Ser. No. 60/373,360 with the same title.

DESCRIPTION

BACKGROUND OF THE INVENTION

1. Field of the Invention

The present invention generally relates to heat exchange devices, and more particularly relates to heat exchange devices used for heat exchange in products inside a flexible pouch.

2. Background Information

Many items, especially food items, are processed in bulk packages that are flexible plastic pouches. The product may be heated or cooked before it is added to the pouch, or it may also be cooked in the pouch. If the product is cooked before it is placed in the pouch, the hot product needs to be cooled quickly, and passed along to the next step in processing. If the product is added to the pouch while it is cool, heat must be transferred to the product in the pouch, and after the appropriate cooking process is finished, heat must be removed from the pouch and product for further processing.

Prior art devices, which are utilized to accomplish this heat transfer, require that the pouches be turned or otherwise reoriented during the heat transfer process. Sometimes this involves depositing the pouches in a container of water, which can either add or remove heat from the pouch.

What is needed in the industry is a heat transfer device that rapidly heats or cools products in a flexible pouch, and which handles the pouches on a continuous basis without the need to change the orientation of the pouch.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

These and other objects are accomplished by the device of the invention. In the device of the invention, flexible pouches containing a fluid or semi fluid product such as paint, chemicals, and a large variety of food products, are passed along a conveyor belt and pass under one or more pouch flexors. Although the invention can be utilized with any fluid or semi-fluid product in a flexible container, for convenience it will be described in relation to a food product in flexible pouches. In one configuration of the device, the pouch flexors are wheels or rollers. The rollers press down on the material in the flexible pouches and partially depress or constrict the pouch under the pouch flexor. The action of pressing down on the pouch causes movement and displacement of the material inside the pouch. This movement or displacement of material inside the pouch aids in the heat transfer from or to the material in the pouch. When a pouch is cooling by radiation, convection, and/or conduction, the outer layer tends to lose its heat more quickly, and the inner mass of food material retains its heat longer. By agitating, moving, and mixing the product, the warm areas of the material are mixed with the cooler surface zones to present more heated material at the surface for rapid heat transfer. The opposite happens when heat is being added to the pouch, resulting in enhanced heat transfer.

The pouch flexor is typically a wheel or roller, but can also be a fixed structure, such as a fin, wing, or ridge that is configured to press down on the pouch as the pouch passes by it. The device also includes a heat transfer medium for contacting the exterior of the pouch and for transferring heat to or from the product within the pouch. The heat transfer medium would typically be water, but other liquid materials could also be utilized, such as oil or other compounds and mixtures.

In the version of the invention using wheels, the wheels are typically mounted in a stationary position, and are configured to rotate as the pouch is transported past the wheels or rollers. The wheels or rollers may be above or below the pouch, which is typically carried on a conveyor belt. The pouch can be fully or partially submersed in water, and one strategy for use with the invention is to spray the heat transfer medium onto the pouches from above, below, or both directions.

Besides the wheel or fixed structure, a jet of air or gas can be utilized to compress and distort the material in the pouch, thereby mixing it.

The wheels or rollers may be configured to come into contact with a pouch sequentially, so that only one wheel or roller is in contact with the pouch at a time.

The invention also includes a device that is made up of one or more arrays of wheels or rollers, with conveyor belts for conveying a number of lines of pouches through the array of wheels or rollers. The arrays can be set up so that multiple conveyers travel through the arrays, with the wheels of the arrays contacting pouches on the conveyer belt while heat exchange medium contacts the pouches, by spray or immersion. The conveyer belt can be arranged in a spiral, with the pouches being carried through the spiral and being contacted by numerous wheel arrays and numerous sprayers of heat transfer liquid.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

Figure 1:
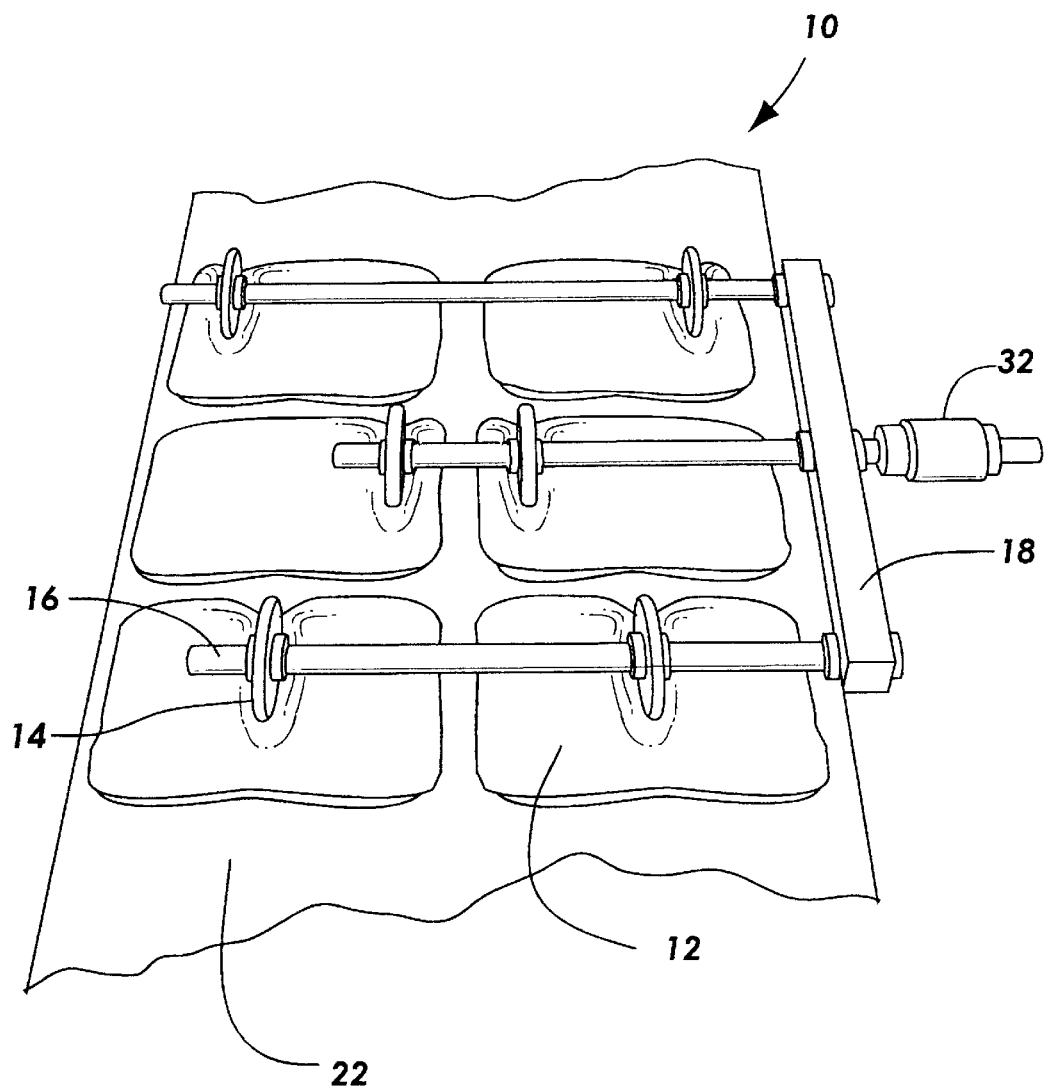
FIG. 1 is a perspective view of a wheel array and pouches on a conveyer belt of the invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Several preferred embodiments of the device of the invention are shown in FIGS. 1–5. FIG. 1 shows the inventions as an array of wheels with a conveyor belt moving pouches past the wheels. In this embodiment, one wheel contacts each pouch at a time, allowing for deeper compression by the wheel.

Figure 2A:
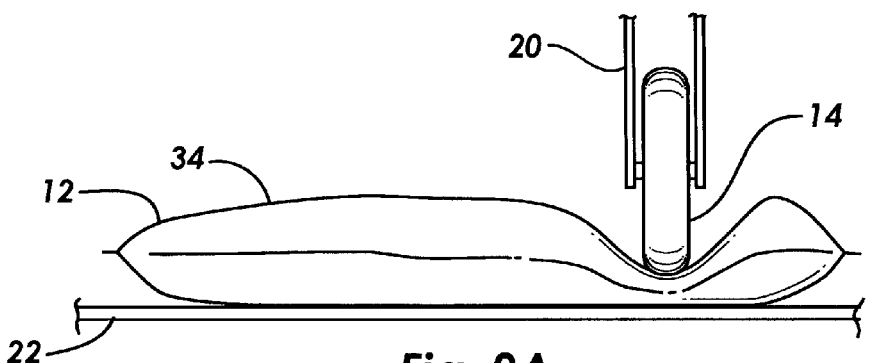
FIG. 2A is a front view of a pouch being contacted by a first of three pouch flexors of the invention.
Figure 2B:
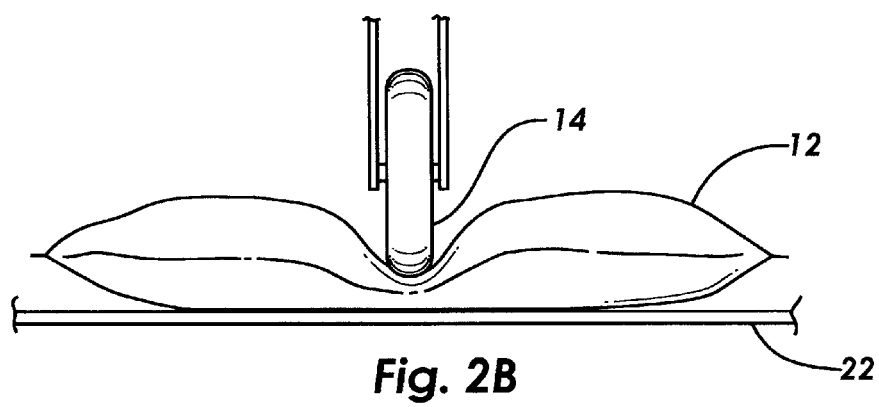
FIG. 2B is a front view of a pouch being contacted by a second of three pouch flexors of the invention.
Figure 2C:
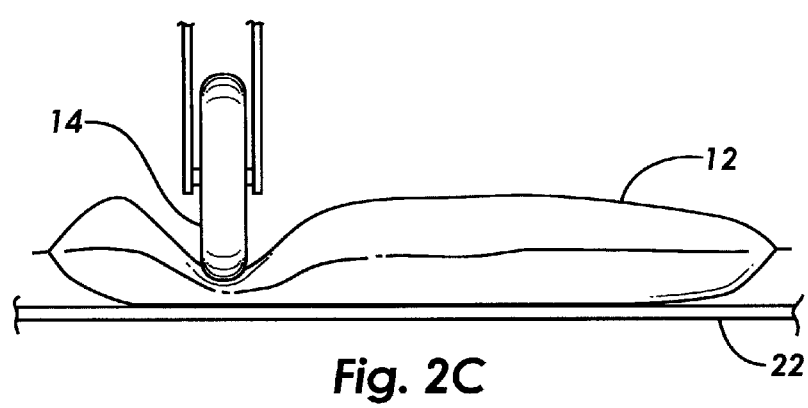
FIG. 2C is a front view of a pouch being contacted by a third of three pouch flexors of the invention.

FIGS. 2A–2D show the device 10 and its principle of operation of the device. In FIG. 2A, a wheel 14 mounted on a strut 20 contacts the pouch 12 and depresses or partially constricts it as shown. This causes a mixing of the food product 34. The wheel is preferably mounted in a stationary position and the pouches 12 move under it on a conveyer belt 22. FIG. 2B shows the same pouch 12 being contacted by another wheel 14. This additional contact further mixes the contents of the pouch, which is typically a food product 34. FIG. 2C shows a third wheel 14 contacting the pouch 12, which causes additional mixing and thus exposes additional material adjacent the pouch surface for increased heat transfer. Although a contact sequence of three wheels is shown in FIG. 2, more than or fewer than three wheels can also be used. Other devices can be used as the pouch flexor, such as fixed fins, wings, ridges, or jets of fluid.

Figure 2D:
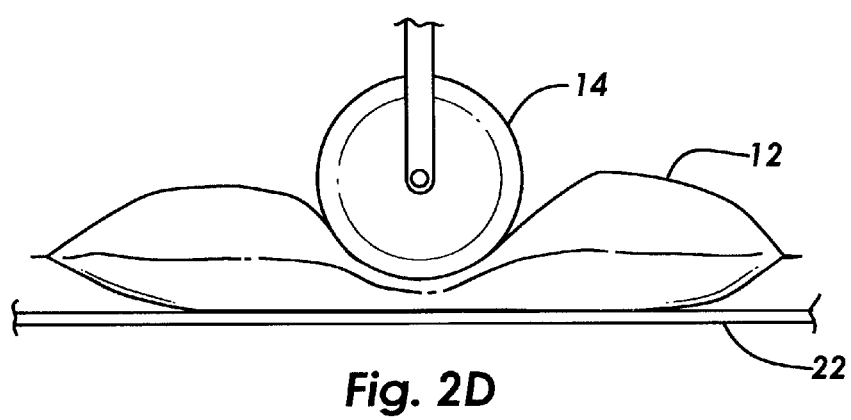
FIG. 2D is a side view of a pouch being contacted by a wheel.

FIG. 2B is a side view of a pouch being contacted by the wheel 14, showing a typical compression pattern of the pouch 12. There is some advantage to having only one wheel of the wheel array contact the pouch at a time, so that the three wheels of FIGS. 2A, 2B, and 2C would each be in contact with the bag sequentially. However, it is also within the scope of the invention for more than one wheel to be contacting the bag at any one time. The practicality of doing this would depend on the dimensions of the pouch and the size, spacing, and configuration of the wheels in the wheel array. FIG. 2D is a side view of the wheel 14 contacting the pouch 12.

The device of the invention can be configured for pouches of a variety of sizes. The size of the pouch would often determine the dimensions of other components of the system. As an example, and not to be interpreted as being a restrictive limitation, one preferred combination of units for a device of the invention include a pouch that is approximately twelve by fifteen inches in dimension, is approximately two inches thick in the center, and tapers to edges that are sealed by a form-fill-and seal machine. Such a pouch would typically hold about seven pounds of product. These dimensions are stated to give approximate measurements for a preferred embodiment of one particular pouch configuration and they are not intended to limit the scope of this invention.

A preferred configuration of wheels for such a pouch would be approximately seven inches in diameter, and about one-half inch wide with a rounded shape at the circumference for contacting the bag. The wheels can be made from a variety of materials, including nylon, Teflon®, aluminum or other metals, or any other suitable material. Although the main effect of the wheel is to act as a mechanical means of mixing the materials, the wheels can also be configured to aid in heat transfer by acting as a heat sink or heat transfer device.

Figure 3:
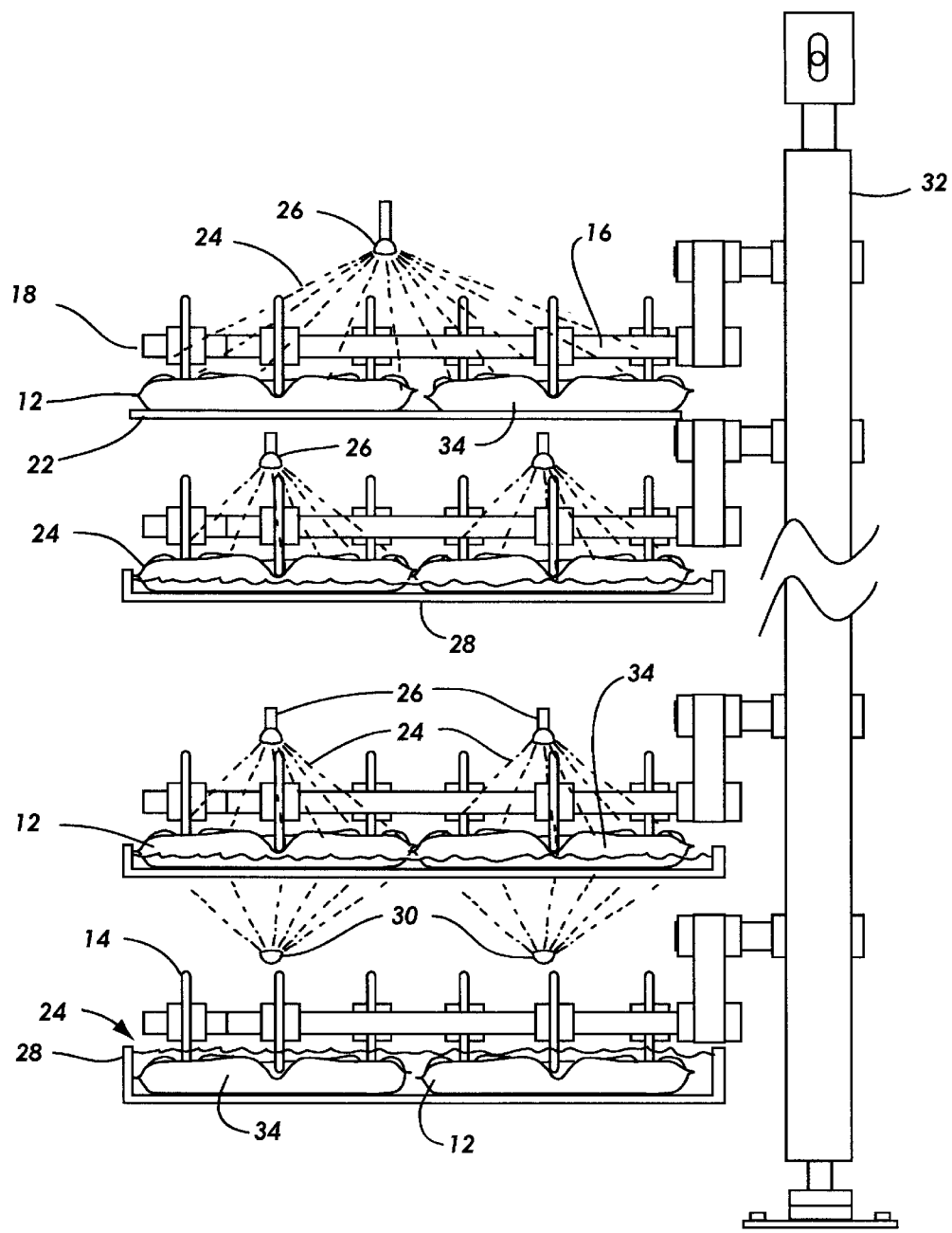
FIG. 3 is a cross-sectional view of the device configured with four levels of wheel arrays and four conveyor belts, each conveyor belt with multiple pouch lines.

The conveyer can take a number of forms. It is typically a material that is compatible with food processing systems, such as stainless steel, nylon, silicon, neoprene, or other non-contaminating material. For a system as shown in FIG. 3 in which the conveyer belt is wide enough for two lines of pouches, the conveyer belt would be approximately thirty-six inches wide. One preferred embodiment of the invention includes sprayers that are above the conveyer belt, and which water is used as a heat transfer medium 24 and is sprayed onto the pouches 12 by a spray nozzle 26.

The preferred embodiment of the invention uses wheels 14 as the pouch flexor, with the wheels arranged in a wheel array 18 as shown in FIG. 1. In FIG. 1, the wheel array includes three axles 16, each with two wheels 14 mounted on it. In the configuration as shown in FIG. 1, the conveyer belt containing pouches would be traveling from bottom to top, and is configured so that one pouch at a time is contacted by a wheel. However, at any one time all of the wheels of the array are contacting a pouch, as shown in FIG. 1.

The preferred configuration of this device utilizes wheels with a diameter of seven inches on a one and a quarter inch diameter axle. Much of the structure for this array is made of stainless steel, for strength and non-contamination of food processes. The two longer axles of this configuration would be approximately thirty-four inches long, and the shorter axle is twenty inches long. The wheel array support 32 is preferably made of four inch wide tubular steel, and the wheel array 18 is square tubing one and a quarter inches in diameter. The dimensions of these support structures could vary depending on the requirements of the specific embodiment.

FIG. 3 shows one preferred embodiment of the invention in which four sets of wheel arrays are mounted on a wheel array support 32. In this configuration, four conveyor belts 22 would pass under the four levels of wheel arrays 18. One preferred embodiment of the device is one in which the conveyer belts and wheel arrays are configured to be in a spiral orientation. Thus, the conveyer belt shown in FIG. 4 could be one long conveyor belt that spirals around in a circular and spiral structure, carrying two lines of pouches around the spirals of the conveyer belt, while heat transfer medium 24, which is preferably water, is sprayed on the entire apparatus by a spray nozzle 26. One advantage of this configuration is that the entire area can be sealed off and subjected to massive sprays of water. The pouches 12 can enter the system either at the top or bottom of the spiral, and be subjected to heat exchange while traveling through the spiral. The heat exchange can be adding heat or removing heat from the pouches. One preferred embodiment of this array includes a spiral flight of conveyers that involve twenty-eight rotations of the conveyor 22, and stands approximately 216 inches tall. FIG. 3 shows a number of possible configurations of sprayers and partial and complete immersion in an immersion tray 28. Bottom sprayers 30 are also an option.

Figure 4A:
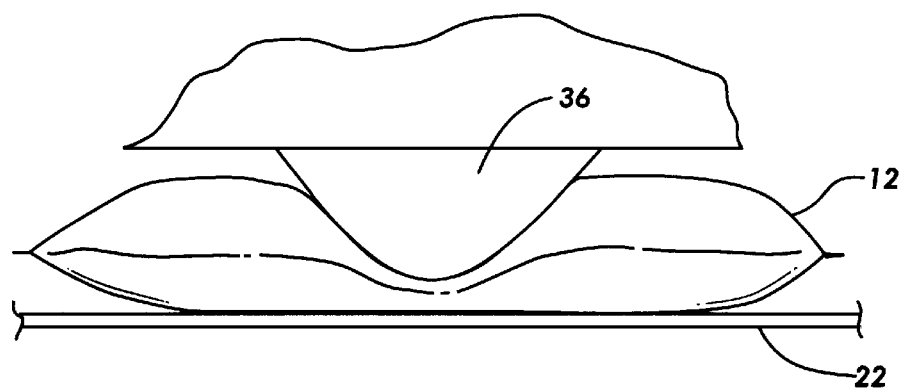
FIG. 4A is a side view of the device of the invention in which the pouch flexor is a fixed structure, such as a fin or wing.
Figure 4B:
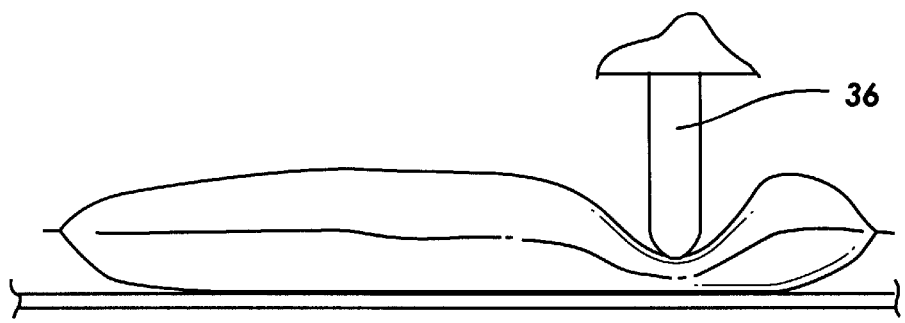
FIG. 4B is a front view of the fixed pouch flexor of the device.

FIGS. 4A and 4B show another preferred embodiment of the pouch flexor of the device in which a stationary shape is used as the pouch flexor. This shape contacts and presses on the pouch and its contents, just like the wheel, except that it is a stationary fin, ridge or wing 36, as shown in FIGS. 4A and 4B.

Figure 5:
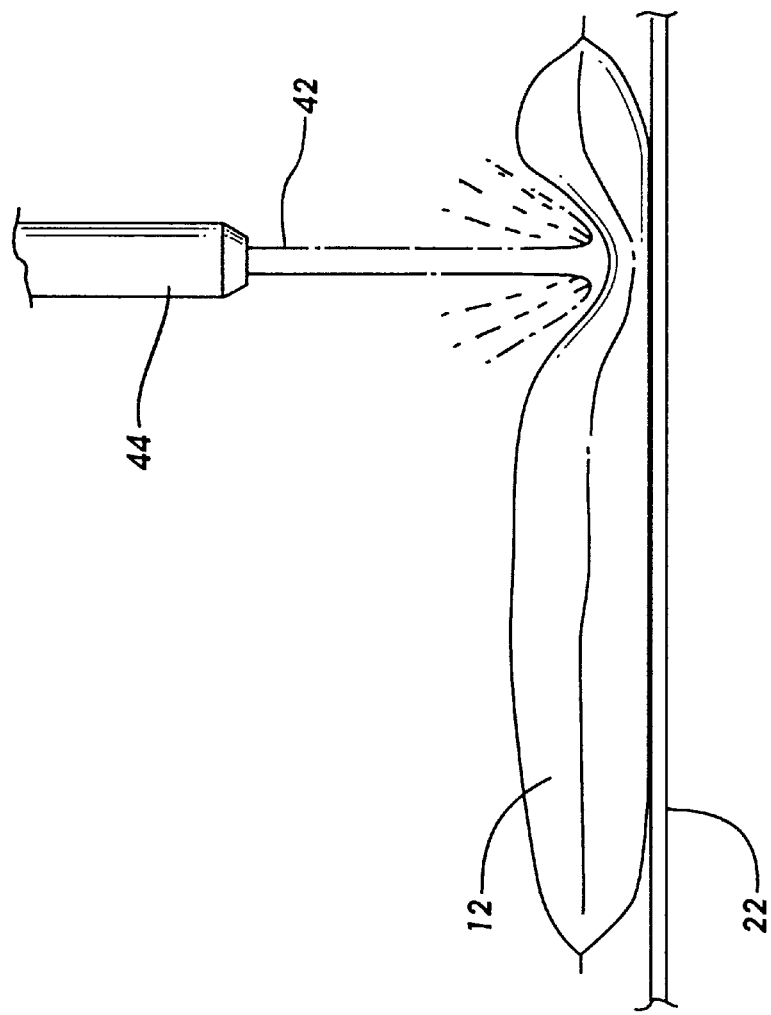
FIG. 5 is a front view of the device in which the pouch flexor is a jet of gas.

FIG. 5 shows another alternative type of pouch flexor, which can be a jet of gas. FIG. 5 shows an air nozzle 44 and an air stream 42.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A device for accelerating heat transfer in a product contained in a flexible container or pouch, comprising:
   a pouch flexor which is less wide than a side of said vouch presented to said pouch flexor, for physically distorting said pouch by pressing on said pouch, and thereby moving and mixing said product laterally and longitudinally inside said pouch, while maintaining the orientation of said pouch;
   a heat transfer medium, for contact with said pouch and for transferring heat to or from said product within said pouch:
      wherein said pouch flexor is configured for distorting and thereby mixing said pouch contents, and in so doing exposes a fresh layer of product to contact with said pouch, for exposure of said fresh layer of product to said heat transfer medium, for enhanced heat exchange with said product.

2. The device of claim 1, in which the pouch flexor is one or more wheels or rollers configured to press against said pouch and distort said pouch.

3. The device of claim 2 in which said wheels or rollers are mounted in a stationary position, and are configured to rotate against said pouch as the pouch is transported past said wheels or rollers.

4. The device of claim 3, in which said pouch is partially or fully submersed in said heat transfer liquid.

5. The device of claim 1, in which said pouch flexor is a fixed structure such as a fin, wing, or ridge, which is configured to at least partially compress said pouch, and thereby distort said pouch which causes movement and mixing of said product in said pouch for enhanced heat exchange.

6. The device of claim 5, in which said pouch is partially or fully submersed in said heat transfer liquid.

7. The device of claim 1, in which said pouch flexor is a jet of air or gas, which is configured to at least partially compress said pouch and thereby move and mix said pouch contents for enhanced heat exchange.

8. The device of claim 7, in which said pouch is partially or fully submersed in said heat transfer liquid.

9. The device of claim 2 which further includes a heat transfer system for heat transfer from said wheels or rollers.

10. The device of claim 9 in which said heat transfer system for said wheels or rollers is a passive heat transfer system.

11. The device of claim 1 which includes at least one contact device for causing said heat transfer liquid to come into contact with said pouch.

12. The device of claim 11 in which said at least one contact device is at least one spray nozzle for spraying said heat transfer liquid against said pouch.

13. The device of claim 11 in which said at least one contact device is at least one spray nozzle for spraying said heat transfer liquid against both sides of said pouch.

14. The device of claim 1 which further includes a pouch conveyer for moving said pouch through said device for accelerating heat transfer in a product contained in a flexible container or pouch.

15. The device of claim 3 which further includes one or more arrays of wheels or rollers with said wheels or rollers are configured to contact said pouch sequentially and to thus enhance heat transfer from said pouch.

16. A device for accelerating heat transfer in a product contained in a flexible container or pouch, comprising:
   a pouch flexor comprised of one or more wheels or rollers mounted in a stationary position, for physically distorting said pouch as it moves past said wheels or rollers, and thereby moving and mixing said product, while maintaining the orientation of said pouch;
   at least one pouch conveyer for moving said pouch through said device and past said one or more wheels or rollers;
   a water based heat transfer medium, for contact with said pouch and for transferring heat to or from said product within said pouch:
      at least one spray nozzle for spraying said heat transfer liquid against said pouch;
      wherein said pouch flexor is configured for distorting and thereby mixing said pouch contents, and in so doing exposes a fresh layer of product to contact with said pouch, for exposure of said fresh layer of product to said heat transfer medium, for enhanced heat exchange with said product.

17. The device of claim 16, in which said pouch is partially or fully submersed in said heat transfer liquid.

18. The device of claim 16 which further includes one or more arrays of wheels or rollers with said wheels or rollers are configured to contact one or more of said pouches sequentially and to thus enhance heat transfer from said pouch.

19. A device for accelerating heat transfer in a product contained in a flexible container or pouch, comprising:
   one or more pouch flexor assemblies comprised of one or more arrays of wheels or rollers mounted in a stationary position, for physically distorting pouches as said pouches move past said wheels or rollers, and thereby moving and mixing said product, while maintaining the orientation of said pouch;
   at least one pouch conveyer for moving said pouch through said arrays of wheels or rollers and past said one or more wheels or rollers;
   a water based heat transfer medium, for contact with said pouch and for transferring heat to or from said product within said pouch:
      at least one spray nozzle for spraying said heat transfer liquid against said pouch;
      wherein said pouch flexor assemblies are configured for distorting and thereby mixing said pouch contents, and in so doing exposes a fresh layer of product to contact with said pouch, for indirect exposure of said fresh layer of product to said heat transfer medium, for enhanced heat exchange with said product.

20. A method for accelerating heat transfer in a product contained in a flexible container or pouch, comprising the steps of:

providing a conveyor belt for conveying a plurality of said flexible pouches;

providing a plurality of pouch flexor assemblies comprised of one or more arrays of wheels or rollers mounted in a stationary position, for physically distorting pouches as said pouches move past said wheels or rollers, and thereby moving and mixing said product, while maintaining the orientation of said pouch;

contacting said pouches with a water based heat transfer medium, to increase heat transfer to or from said product within said pouch:

wherein said pouch flexor assemblies are configured for distorting and thereby mixing said pouch contents, and in so doing exposes a fresh layer of product to contact with said pouch, for exposure of said fresh layer of product to indirect contact with said heat transfer medium, for enhanced heat exchange with said product.

* * * * *